Jan. 21, 1964  K. H. FAULK  3,118,741
RECOVERY OF VOLATILE MATERIAL FROM PARTICULATE SOLIDS
Filed Oct. 14, 1960
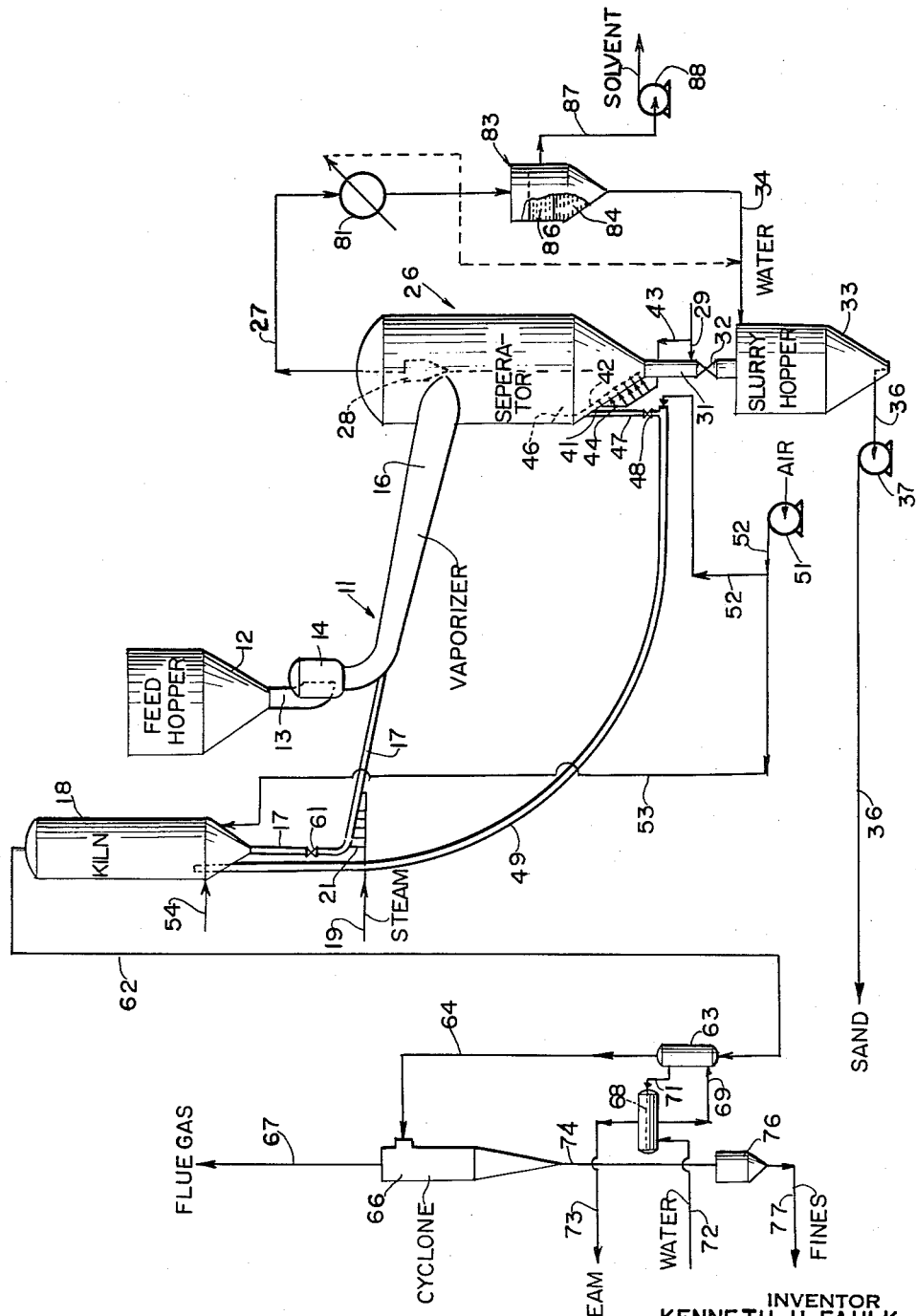
INVENTOR
KENNETH H. FAULK
BY
*William S. Pelham*
ATTORNEY United States Patent Office 3,118,741
Patented Jan. 21, 1964

3,118,741
RECOVERY OF VOLATILE MATERIAL FROM PARTICULATE SOLIDS
Kenneth H. Faulk, Lake Charles, La., assignor to Cities Service Research and Development Company, New York, N.Y., a corporation of New Jersey
Filed Oct. 14, 1960, Ser. No. 62,730
7 Claims. (Cl. 34—9)

This invention relates to removal of volatile liquid from particulate solids.

While the invention is generally applicable to the recovery of volatile liquid from particulate solids, it is especially useful in the recovery of volatile solvents from sand. In the recovery of bitumen from bituminous sand containing the same by extraction with hydrocarbon solvents, for example, at least a portion of the solvent usually remains on the sand and must be removed therefrom for reuse if an efficient operation is to be maintained.

It is an object of the present invention to provide an improved process for the recovery of volatile liquid material from particulate solids.

It is another object of the invention to provide an improved process for the recovery of volatile solvent from particulate solids containing the same.

Another object of the invention is to provide an improved process for the recovery of hydrocarbon solvent from sand in a process for the solvent extraction of bitumen from bituminous sand containing the same.

In accordance with a preferred embodiment of the present invention, volatile liquid may be removed from particulate solids containing the same by introducing particulate solids containing volatile liquid into the upper end of a downwardly slanted contact zone having an increasing cross sectional area from the upper to the lower end thereof. Hot, dry particulate solids from a kiln are introduced into the upper end of the contact zone and steam is also introduced into the upper end of the contact zone to thoroughly mix the solids. The resulting mixture of gases and solids is passed downwardly through the contact zone at substantially constant velocity as the liquid evaporates and solids and vapors are discharged from the contact zone into a separation zone wherein vapors are separated from solids. Vapors are withdrawn from the separation zone and preferably condensed while solids are passed from the separation zone to a stripping zone wherein they may be steam stripped. A portion of the solids from the stripping zone is passed upwardly through a secondary fluidized separation zone with the upward velocity in the secondary separation zone being adjusted to allow the relatively coarser particles to fall back into the stripping zone. Solids from which the relatively coarser particles have been separated are then removed from the upper portion of the secondary separation zone and passed to the kiln. The remainder of the solids are removed from the stripping zone and preferably slurried with at least a portion of the condensed volatile liquid for disposal.

In accordance with a preferred embodiment of another aspect of the present invention, volatile liquid may be removed from particulate solids by the use of apparatus which includes a contact vessel having a downwardly slanted contact zone of increasing cross sectional area from the upper end to the lower end thereof. Means are provided for introducing particulate solids containing volatile liquids, as well as hot, dry particulate solids and gaseous material, into the upper end of the contact zone. A separation vessel is provided for separating vapors and solids from the contact zone and means is provided for passing solids and vapors from the contact zone to the separation vessel. Means are also provided for separately removing gaseous material and solids from the separation vessel. The lower portion of the separation vessel is preferably formed as a stripping zone and means are provided for introducing stripping gas such as steam into this stripping zone. The separation vessel is also provided with a generally vertical standpipe or compartment in fluid communication at the upper end thereof with the separation zone and at the lower end thereof with the stripping zone and provided with means for introducing gaseous material thereto for fluidizing solids within the standpipe or compartment. This standpipe or compartment provides a secondary separation zone wherein solids from which the relatively coarser particles have been removed may be passed to the upper part of the standpipe or compartment. Suitable means are provided for removing such solids from the upper portion of the standpipe or compartment and passing the same to a kiln from which hot solids may be removed as described above.

For a better understanding of the invention, reference should be had to the accompanying drawing, which is a diagrammatic illustration in which equipment is shown in elevation of a suitable arrangement of apparatus for carrying out a preferred embodiment of the invention.

Referring to the drawing, particulate solids containing volatile liquid are fed from a feed hopper 12 through a standpipe 13 and seal 14 into the upper end of a vaporizer 11. In the vaporizer 11 the particulate solids enter the upper end of a general horizontal, downwardly slanted contact zone 16. The use of means such as the feed hopper 12 and standpipe 13 for feeding particulate solids to the vaporizer is preferred since the feed hopper is thus able to serve as a surge vessel and the use of the feed hopper and standpipe provides sufficient pressure build up for particulate solids to flow through the seal 14 into the vaporizer by gravity. The seal 14 may comprise any conventional means, such as a conventional one-way valve, to insure that solids and vapor cannot be blown back from the vaporizer into the feed hopper by pressure surges in the vaporizer.

The particulate solids treated in accordance with the present invention may be of any particle size suitable for fluidization, e.g., between about 5 microns and about ⅜ in., but the invention is especially applicable to treatment of material such as sand in which the majority of the particles are in the size range of approximately 20 to 200 mesh. While the particulate solids to be treated in accordance with the invention will be referred to hereinafter as sand, it should be understood that the treatment of other suitable particulate solids containing volatile liquid is within the scope of the invention.

Likewise, the volatile liquid contained on solids to be treated in accordance with the invention may cover a wide range of materials such as water and hydrocarbon solvents and it should be understood that while the particular embodiment of the invention described herein is especially useful in removing volatile hydrocarbon solvents from sand, the removal of other volatile material from particulate solids in general is considered within the scope of the invention.

The sand containing volatile material introduced into the upper end of the contact zone 16 as described above is contacted therein with a mixture of gas and hot sand introduced by suitable means such as a conduit 17. The hot sand is obtained through the conduit 17 from a suitable source, such as a kiln 18, and is at an elevated temperature, such as between about 1000 and about 2000° F., preferably at least about 1200° F. In order to transport the sand through the contact zone, gaseous material such as steam is also introduced into the upper portion of the contact zone 16. As shown in the drawing, the steam may be injected through a conduit 19 and suitable nozzles such as 21 into the conduit 17 in order to assist in transporting the hot sand into the contact zone. Within the contact zone 16 the steam and hot sand mix with the wet sand and the resulting mixture passes through the contact zone at a suitable velocity such as between about 20 and about 150 feet per second.

In order to maintain constant velocity through the contact zone as the volatile liquid vaporizes from the wet sand under the influence of the steam and hot sand, the cross sectional area of the contact zone increases from the upper to the lower end thereof. The contact zone 16, while generally horizontal, is downwardly slanted and the bottom of the contact zone should be sufficiently slanted to prevent buildup of coarse particles of sand in the contact zone. While the degree of slope of the bottom of the contact zone may, of course, vary quite widely with the treatment of different particulate solids and the use of varying velocities through the contact zone, the slope of the bottom of the contact zone is preferably between about 5 and about 30°. The contact zone 16 may be operated under any suitable pressure with relatively small superatmospheric pressures, such as between about 5 and about 10 p.s.i.g., being preferred. By the use of a gradually enlarging cross sectional area and sloping bottom in the contact zone as described above, any oversize material in the wet sand is carried through the contact zone at lower velocities than would be possible in a completely horizontal contact zone and the erosion of the walls of the contact zone is considerably less than would be the case if the necessary velocity were maintained to move the coarser solids particles through the contact zone by velocity alone.

From the contact zone 16 the sand and gaseous material passes to a separator vessel 26 in which solids are separated from vapors. In addition, the separator 26 serves to complete the evaporation of any volatile material which might remain on sand particles. While the solids and vapors may be transferred from the contact zone to the separator in any suitable manner, it is preferred, as shown in the drawing, to accomplish this by having the contact zone 16 discharge directly into the separator. In the separator 26 gaseous material rises to the top of the separator and is removed by suitable means such as a conduit 27 while solids settle to the lower portion of the separator. Any fines entrained with the gaseous material may be removed by suitable means such as a cyclone separator 28. The solids in the lower portion of the separator 26 are maintained in a fluidized condition by means of stripping gas, such as steam, introduced through suitable means as a conduit 29.

After being stripped in a lower stripping section 31 of the separator 26 by the stripping steam introduced through conduit 29, the solids are withdrawn through suitable means such as a valve 32 and may be disposed of in any suitable manner. As shown in the drawing, the solids may conveniently be disposed of by slurrying in a tank 33 with water introduced as through a conduit 34. The resulting slurry of sand and water may then be passed to a suitable sand disposal system as through a conduit 36 and pump 37.

As shown in the drawing, the lower portion of the separator 26 is preferably provided with a secondary separation zone 41 which is in fluid communication with the interior of the separator 26 at top and bottom but is otherwise separated from the interior of the separator as by a partition 42. This secondary separation zone is used to separate sand which it is desired to pass to the kiln 18 as described below. In order to obtain this sand free of relatively coarser particles (e.g., those retained on a 20 mesh screen in the case of sand), gaseous material such as steam is introduced into the secondary separation zone 41 as through a conduit 43 and nozzles 44. This steam passes upwardly through the secondary separation zone and carries with it entrained or fluidized sand from which relatively heavier particles are separated by controlling the upward velocity of the steam in the secondary separation zone. While the secondary separation zone 41 is in fluid communication with the interior of the separator 26 at its upper portion so that steam is free to escape therefrom, a baffle 46 is provided to prevent solids from entering the top of the secondary separation zone. Sand to be passed to the kiln 18 may be withdrawn from the upper portion of the secondary separation zone 41, as through a standpipe 47 and valve 48, and passed to the kiln 18, as through a transfer line 49, by the use of suitable lift gas such as air which may be introduced by a compressor 51 through a conduit 52. By removing the relatively coarser particles from the sand to be passed to the kiln, the velocities necessary in the transfer line 49 are substantially lowered and unnecessary erosion of the transfer line is thereby avoided.

In the kiln 18 the sand is maintained in a fluidized condition by suitable means such as air injected through the conduit 52 and a conduit 53. The fluidized sand in the kiln 18 is heated to the desired temperature by combustion. If necessary, fuel may be introduced to the kiln, as through a conduit 54, but it is anticipated that in some instances the sand may contain sufficient fuel when it is introduced into the kiln. When the process of the present invention is used to remove volatile solvent from bituminous sand from which bitumen has been recovered by solvent extraction, the residual bitumen remaining on the sand particles frequently provides at least a portion of the fuel required for operation of the kiln and any fuel introduced through the conduit 54 merely supplements the energy available from this residual bitumen. Where the particulate solids being heated do not contain any fuel when they are introduced into the kiln, fuel may be supplied separately, as through the conduit 54, to supply the entire energy requirement for heating the solids to the desired temperature.

Hot sand is withdrawn from the kiln through the conduit 17 and a valve 61 for passage to the contact zone 16 through the conduit 17 as described above. Vapors may be withdrawn from the kiln through a conduit 62. Since these vapors contain considerable heat energy, they are preferably passed in heat exchange with water, as in a heat exchanger 63, and are then passed through a conduit 64 to suitable means, such as a cyclone separator 66, for removal of any entrained solids before being discharged as flue gas through a conduit 67. Fines recovered from the cyclone separator 66 may be disposed of in any suitable manner such as passing through a conduit 74 into a hopper 76 from which they may be disposed of as through a conduit 77. The heat energy removed from the vaporous material in the heat exchanger 63 is preferably transferred to water circulated from a waste heat boiler 68 through a conduit 69, with steam being returned to the waste heat boiler through a conduit 71. Water may be introduced to the waste heat boiler through a conduit 72 and steam withdrawn therefrom through a conduit 73.

The vaporous material withdrawn from the separator 26 through the conduit 27 may be disposed of in any suitable manner. Since the particular arrangement of apparatus shown in the drawing is especially adapted for the removal of volatile hydrocarbon solvents from sand, the overhead vapors in the conduit 27 contain a mixture of steam and vaporous hydrocarbons. In order to recover the hydrocarbons therefrom, this mixture of vapors is preferably condensed in a condenser 81 and the condensate passed through a conduit 82 to a settling tank 83 in which the condensate is allowed to settle to form in the settling tank a lower layer 84 of water and an upper layer 86 of hydrocarbon solvent. Liquid hydrocarbons may then be withdrawn from the upper layer 86 through a conduit 87 and pump 88 while water may be withdrawn from the lower layer 84 through conduit 34 and passed to the slurry hopper 33 for slurrying with sand from the separator 26 as described above.

The following specific example illustrates a practical application of the present invention using the arrangement of apparatus shown in the drawing for the removal of volatile hydrocarbon solvent from sand containing the same. This particular sand has been obtained from a process in which bituminous sand has been treated with hydrocarbon solvent for the removal of bitumen therefrom by solvent extraction. The sand from this process contains residual bitumen and hydrocarbon solvent and is treated in accordance with the present invention for removal of hydrocarbon solvent therefrom.

Referring to the drawing, sand containing volatile liquid hydrocarbon solvent passes from the feed hopper 12 through the standpipe 13 and seal 14 into the contact zone 16 of the vaporizer 11 at the rate of 4,956,500 lbs. per hour. This stream of wet sand has the following composition.

| Ingredients | Pounds per hour |
|---|---|
| Bitumen | 25,750 |
| Heavy solvent | 25,750 |
| Light solvent | 258,250 |
| Water | 228,000 |
| Sand passing 200 mesh screen | 306,000 |
| Sand retained on 200 mesh screen | 4,112,750 |

The bitumen, heavy solvent and light solvent contained in the wet sand have the following properties:

| | Light solvent | Heavy solvent | Bitumen |
|---|---|---|---|
| Gravity, °API | 61.7 | 30.4 | 6.8. |
| Vis., centistokes. | 0.81 @ 50°F | 3.7 @ 100°F | 27,000 @ 100°F. |
| | 0.62 @ 100°F | 1.4 @ 210°F | 420 @ 210°F. |
| ASTM distillation, °F. | | | |
| IBP | 139 | 490 | 545. |
| 10% | 173 | 520 | 680. |
| 30% | 213 | 535 | 880. |
| 50% | 262 | 550 | 46% @ 1005°F. |
| 70% | 307 | 568 | |
| 90% | 351 | 600 | |
| EP | 394 | 640 | |

In this particular example the contact zone 16 has a generally conical shape with an inside diameter of 4.6 inches at its upper end and a diameter of 8.6 inches at its lower end and the bottom contact zone is slanted downwardly at an angle of 15°. Steam is introduced from the conduit 19 at the rate of 1,220 lbs. per hour while hot sand from the kiln 18 is introduced into the contact zone 16 through the conduit 17 at a temperature of 1,600° F. at the rate of 1,185,000 lbs. per hour. The pressure in the contact zone 16 is maintained between 5 and 10 p.s.i.g. and the velocity of solids and vapors therethrough is maintained at approximately 50 feet per second by the increasing cross sectional area of the contact zone. The interior of the separator 26, into which solids and vapors from the contact zone 16 are discharged, is maintained at a pressure of 5 p.s.i.g. and a temperature of 235° F. Stripping steam is introduced into the stripping section 31 of the separator 26 at the rate of 8,800 lbs. per hour and into the secondary separation zone 41 at the rate of 1,000 lbs. per hour. Sand from the secondary separation zone is transferred to the kiln 18 through the transfer line 49 at the rate of 1,274,000 lbs. per hour of which 89,000 lbs. per hour is carried out of the kiln with the flue gas through the conduit 62 and the remainder is passed to the contact zone 16 through the conduit 17. In this example residual bitumen on the sand carried to the kiln through the transfer line 49 supplies only a portion of the necessary heat and 2,344 barrels per day of additional bitumen is injected through the conduit 54 and burned in the kiln to provide the additional heat necessary to maintain the temperature of the sand in the kiln at 1600° F. Pressure in the kiln is maintained at 5 p.s.i.g. 4,325,750 lbs. per hour of sand is slurried with water in the slurry hopper 33 and removed through the conduit 36 while 283,800 lbs. per hour of hydrocarbon solvent is removed through the conduit 87 and preferably sent to a fractionation unit for recovery of the various hydrocarbon fractions therefrom.

While the invention has been described above with respect to a preferred embodiment thereof, it will be understood by those skilled in the art that various changes and modifications may be made without departing from the spirit and scope of the invention and it is intended to cover all such changes and modifications in the appended claims.

I claim:
1. The method for removing volatile liquid material from particulate solids containing the same which comprises introducing said solids into a contact zone having a downward slant of between about 5 and about 30°, introducing hot particulate solids from a kiln into said contact zone, introducing hot vaporous material into said contact zone to mix said hot solids with said solids containing liquid and to transport the resulting mixture through said contact zone, the cross sectional area of the contact zone increasing as the mixture of solids and vapors passes therethrough whereby substantially constant velocity may be maintained during vaporization of at least a portion of the volatile material therein, discharging solids and vapors from said contact zone into a separation zone wherein vapors are separated from solids, withdrawing vapors from said separation zone and condensing the same, withdrawing a portion of the solids from said separation zone, and passing same upwardly through a fluidized secondary separation zone to remove relatively coarser particles therefrom, passing solids from the upper portion of the secondary separation zone to said kiln, and withdrawing the remainder of the solids from the separation zone and slurrying same with at least a portion of the condensed volatile material for disposal.

2. The method for removing volatile liquid material from particulate solids containing the same which comprises introducing said solids into a downwardly slanted contact zone, introducing hot particulate solids from a kiln into said contact zone, introducing sufficient hot vapors into said contact zone to maintain the velocity therein between about 20 and about 150 feet per second, the cross sectional area of the contact zone increasing as the mixture of solids and vapors passes therethrough whereby substantially constant velocity may be maintained during vaporization of at least a portion of the volatile liquid, discharging solids and vapors from said contact zone into a separation zone wherein vapors are separated from solids, withdrawing vapors from said separation zone and condensing at least a portion of the same, passing solids from said separation zone to a stripping zone wherein the same are stripped to remove additional volatile material, passing a portion of the solids from said stripping zone upwardly through a fluidized secondary separation zone to separate relatively coarser particles therefrom, withdrawing solids from which relatively coarser particles have been removed from the upper portion of said secondary separation zone and passing same to said kiln, and removing the remainder of the solids from said stripping zone and slurrying same with at least a portion of the condensed volatile material for disposal.

3. A method of removing relatively light hydrocarbon solvent from sand particles containing the same which comprises introducing sand containing liquid hydrocarbon solvent boiling between about 100 and about 500° F. into a downwardly slanted contact zone, said contact zone having a slope of between about 5 and about 30°, introducing hot sand at a temperature of at least about 1200° F. from a kiln to said contact zone, injecting steam into said contact zone to thoroughly mix said hot sand with said sand containing light hydrocarbon solvent to thereby at least partially vaporize the same, said steam being introduced in quantities sufficient to maintain the velocity of the mixture of sand and vapors through said contact zone at between about 20 and about 150 feet per second, the cross sectional area of said contact zone increasing as the mixture of vapors and solids progresses therethrough whereby the velocity of material passing through the contact zone is relatively constant as additional vapors are formed by vaporization of hydrocarbon solvent from sand, passing a mixture of sand and vapors from said contact zone to a separation zone for separation of vapors from solids, withdrawing vapors from the separation zone, withdrawing a portion of the sand from a lower portion of said separation zone and passing same upwardly through a fluidized secondary separation zone by the injection of additional steam thereto whereby relatively coarser sand particles are separated from the portion of sand passing upwardly through said secondary separation zone, and withdrawing sand from the upper portion of said secondary separation zone and passing the same to said kiln.

4. A method of removing relatively light hydrocarbon solvent from sand particles containing the same which comprises introducing sand containing light liquid hydrocarbon solvent boiling between about 100 and about 500° F. into a downwardly slanted contact zone, said contact zone having a slope of between about 5 and about 30°, introducing hot sand at a temperature of at least about 1200° F. from a kiln to said contact zone, injecting steam into said contact zone to thoroughly mix said hot sand with said sand containing light hydrocarbon solvent to thereby at least partially vaporize the same, said steam being introduced in quantities sufficient to maintain the velocity of the mixture of sand and vapors through said contact zone at between about 20 and about 150 feet per second, the cross sectional area of said contact zone increasing as the mixture of vapors and solids progresses therethrough whereby the velocity of material passing through the contact zone is relatively constant as additional vapors are formed by vaporization of hydrocarbon solvent from sand, passing a mixture of sand and vapors from said contact zone to a separation zone for separation of vapors from solids, withdrawing vapors from the upper portion of the separation zone and condensing the same, passing condensed vapors to a settling zone to form therein an upper layer of hydrocarbon liquid and a lower layer of water and separately removing each of the said layers from said settling zone, passing sand from said separation zone to a stripping zone, withdrawing a portion of the sand from said stripping zone and passing same upwardly through a fluidized secondary separation zone by the injection of additional steam thereto whereby relatively coarser sand particles are separated from the portion of sand passing upwardly through said secondary separation zone, withdrawing sand from the upper portion of said secondary separation zone and passing the same to said kiln, and withdrawing additional sand from said stripping zone and slurrying the same with water from the lower layer of said settling zone for convenient disposal.

5. A method of removing relatively light liquid hydrocarbon solvent from sand particles containing the same which comprises introducing sand containing light liquid hydrocarbon solvent boiling between about 100 and about 500° F. into a downwardly slanted contact zone, said contact zone having a slope of between about 5 and about 30 degrees, introducing sand from which volatile material has been removed into a kiln and heating the same therein to a temperature of at least about 1200° F., passing hot sand from said kiln to said contact zone, introducing steam into said contact zone to thoroughly mix said hot sand with said sand containing light hydrocarbon solvent to thereby at least partially vaporize the same, said steam being introduced in quantities sufficient to maintain the velocity of the mixture of sand and vapors through said contact zone at between about 20 and about 150 feet per second, the cross sectional area of said contact zone increasing as the mixture of vapors and solids progresses therethrough whereby the velocity of material passing through the contact zone is relatively constant as additional vapors are formed by vaporization of hydrocarbon solvent from sand, passing a mixture of sand and vapors from said contact zone to a separation zone for separation of vapors from solids, withdrawing vapors from the upper portion of the separation zone and condensing the same, passing condensed vapors to a settling zone to form therein an upper layer of hydrocarbon liquid and a lower layer of water and separately removing each of the said layers from said settling zone, passing sand from said separation zone to a stripping zone wherein the same is stripped with steam, passing a portion of the sand from said stripping zone upwardly through a fluidized secondary separation zone by the injection of additional steam thereto whereby relatively coarser sand particles of a size to be retained on a 20 mesh screen are separated from the portion of sand passing upwardly through said secondary separation zone, withdrawing sand from the upper portion of said secondary separation zone and passing the same to said kiln, and withdrawing sand from said stripping zone and slurrying the same with water from the lower layer of said settling zone for convenient disposal.

6. Apparatus for the removal of volatile material from particulate solids comprising a downwardly slanted vaporizing chamber of increasing cross sectional area from the upper to the lower end thereof, the bottom of said vaporizing chamber having a slope from the upper to the lower end thereof between about 5 and about 30° from the horizontal, means for introducing particulate solids wet with volatile material into the upper portion of said vaporization chamber, a kiln, means for introducing hot, dry particulate solids from said kiln into the upper portion of said vaporization chamber, means for introducing gaseous material into the upper portion of said vaporization chamber to mix said wet solids and said dry solids and assist in transporting the same from the upper portion of said vaporization chamber to the lower portion thereof, a vapor-solids separation vessel having a vertical separation chamber therein, means for separately removing vapors and solids from said separation chamber, means for maintaining a fluidized bed of particulate solids in the lower portion of said separation chamber, a secondary separation chamber positioned within said separation chamber, the lower portion of said secondary separation chamber being in fluid communication with the lower portion of said separation chamber below the top of the fluidized bed in said separation chamber, the upper portion of the said secondary separation chamber being in fluid communication with said separation chamber above the level of the fluidized bed therein, means for preventing entrance of solids into the upper portion of said secondary separation chamber, means for maintaining a fluidized bed of solid particles in said secondary separation chamber and means for withdrawing solids from the upper portion of said fluidized bed, and means for passing solids thus withdrawn from the secondary separation chamber to said kiln.

7. Apparatus for the removal of volatile material from particulate solids comprising a downwardly slanted vaporizing chamber of increasing cross sectional area from the upper to the lower end thereof, the bottom of said vaporizing chamber having a slope from the upper to the lower end thereof of between about 5 and about 30° from the horizontal, means for introducing particulate solids wet with volatile material into the upper portion of said vaporization chamber, a kiln, means for introducing hot, dry particulate solids from said kiln into the upper portion of said vaporization chamber, means for introducing gaseous material into the upper portion of said vaporization chamber to mix said wet solids and said dry solids and assist in transporting the same from the upper portion of said vaporization chamber to the lower portion thereof, a vapor-solids separation vessel having a vertical separation chamber therein, means for removing gaseous material from said separation chamber, means for maintaining a fluidized bed of particulate solids in the lower portion of said separation chamber, a secondary separation chamber positioned within said separation chamber, the lower portion of said secondary separation chamber being in fluid communication with the lower portion of said separation chamber below the top of the fluidized bed in said separation chamber, the upper portion of said secondary separation chamber being in fluid communication with said separation chamber above the level of the fluidized bed therein, means for preventing entrance of solids into the upper portion of said secondary separation chamber, means for maintaining a fluidized bed of particulate solids in the secondary separation chamber, means for withdrawing solids from the upper portion of said secondary separation chamber means for passing solids thus withdrawn from said secondary separation chamber to said kiln, means for maintaining solids in said kiln in a fluidized condition, means for heating solids in said kiln to elevated temperatures, means for withdrawing vapors and entrained fine particles of solids from said kiln, and means for passing heated solids from said kiln to the upper portion of said vaporization chamber.

References Cited in the file of this patent

UNITED STATES PATENTS

| | | | |
|---|---|---|---|
| 2,438,450 | Nelson | | Mar. 23, 1948 |
| 2,586,818 | Harms | | Feb. 26, 1952 |
| 2,839,451 | Moser | | June 17, 1958 |
| 2,844,525 | Scott et al. | | July 22, 1958 |
| 2,905,595 | Berg | | Sept. 22, 1959 |

FOREIGN PATENTS

| | | | |
|---|---|---|---|
| 775,790 | Great Britain | | May 29, 1957 |
| 1,188,621 | France | | Mar. 16, 1959 |